(12) United States Patent
Borsa

(10) Patent No.: US 11,216,299 B1
(45) Date of Patent: Jan. 4, 2022

(54) COMPUTING ENVIRONMENT MULTI-ALIASING SYSTEMS AND METHODS

(71) Applicant: Polyverse Corporation, Bellevue, WA (US)

(72) Inventor: Mariusz G. Borsa, Redmond, WA (US)

(73) Assignee: POLYVERSE CORPORATION, Bellevue, WA (US)

( * ) Notice: Subject to any disclaimer, the term of this patent is extended or adjusted under 35 U.S.C. 154(b) by 0 days.

(21) Appl. No.: 17/370,707

(22) Filed: Jul. 8, 2021

Related U.S. Application Data

(63) Continuation-in-part of application No. 17/367,628, filed on Jul. 6, 2021.

(51) Int. Cl.
*G06F 9/455* (2018.01)
*G06F 8/71* (2018.01)

(52) U.S. Cl.
CPC ............ *G06F 9/45558* (2013.01); *G06F 8/71* (2013.01); *G06F 9/4555* (2013.01); *G06F 2009/4557* (2013.01); *G06F 2009/45575* (2013.01); *G06F 2009/45587* (2013.01); *G06F 2009/45591* (2013.01)

(58) Field of Classification Search
None
See application file for complete search history.

(56) References Cited

U.S. PATENT DOCUMENTS

| | | |
|---|---|---|
| 8,014,308 B2 | 9/2011 | Gates, III et al. |
| 8,312,273 B2 | 11/2012 | Nice et al. |
| 8,595,743 B2 | 11/2013 | Gounares et al. |
| 8,650,538 B2 | 2/2014 | Gounares |
| 8,656,135 B2 | 2/2014 | Gounares et al. |
| 8,656,378 B2 | 2/2014 | Gounares et al. |
| 8,694,574 B2 | 4/2014 | Gounares et al. |
| 8,775,437 B2 | 7/2014 | Weitz et al. |
| 8,849,968 B2 | 9/2014 | Hunt et al. |
| 8,909,546 B2 | 12/2014 | Horvitz et al. |
| 8,966,462 B2 | 2/2015 | Gounares et al. |
| 8,978,016 B2 | 3/2015 | Gataullin et al. |
| 9,021,445 B2 | 4/2015 | Gataullin et al. |
| 9,141,502 B2 | 9/2015 | Havemose |
| 9,286,042 B2 | 3/2016 | Gounares et al. |
| 9,292,415 B2 | 3/2016 | Seto et al. |
| 9,389,992 B2 | 7/2016 | Gataullin et al. |
| 9,417,859 B2 | 8/2016 | Gounares et al. |

(Continued)

*Primary Examiner* — Wynuel S Aquino
(74) *Attorney, Agent, or Firm* — Adam L. K. Philipp; Jonathan E. Olson; AEON Law

(57) ABSTRACT

In some variants computing systems and methods are described in regard to establish a version of an operating system in a first computing environment monitored by a support interface (e.g. a hypervisor) and a version of a second operating system in a second environment also monitored by the support interface(s) so that the version of the first operating system supports a resource (e.g. a process) in the first computing environment; allowing the support interface to advance the first application function to and then pause the first application function in an operational state characterized by one or more operating parameters; and establishing polymorphed or other aliased second support interface to which to migrate the paused resource when appropriate.

17 Claims, 10 Drawing Sheets

(56) References Cited

U.S. PATENT DOCUMENTS

| | | | |
|---|---|---|---|
| 9,465,721 B2 | 10/2016 | Garrett et al. | |
| 9,483,590 B2 | 11/2016 | Kishore et al. | |
| 9,558,362 B2 | 1/2017 | Bedoya | |
| 9,665,474 B2 | 5/2017 | Li et al. | |
| 9,807,077 B2 | 10/2017 | Gounares | |
| 9,923,793 B1 | 3/2018 | Gore et al. | |
| 10,033,604 B2 | 7/2018 | Maes et al. | |
| 10,050,797 B2 | 8/2018 | Garrett et al. | |
| 10,127,160 B2 | 11/2018 | Gounares et al. | |
| 10,142,453 B2 | 11/2018 | Shuttleworth et al. | |
| 10,339,837 B1 | 7/2019 | Gounares et al. | |
| 10,356,155 B2 | 7/2019 | Tiwari et al. | |
| 10,360,150 B2 | 7/2019 | Karthikesan | |
| 10,382,424 B2 | 8/2019 | Kroehling et al. | |
| 10,416,979 B2 | 9/2019 | Scrivano et al. | |
| 10,554,685 B1 * | 2/2020 | McArdle | G06F 9/45558 |
| 10,701,213 B2 | 6/2020 | Dyer et al. | |
| 10,733,303 B1 | 8/2020 | Gore et al. | |
| 2014/0274078 A1 | 9/2014 | Hyde et al. | |
| 2016/0191547 A1 * | 6/2016 | Zafar | H04L 63/1416 726/23 |
| 2017/0147811 A1 * | 5/2017 | Angelsmark | G06F 21/53 |

\* cited by examiner

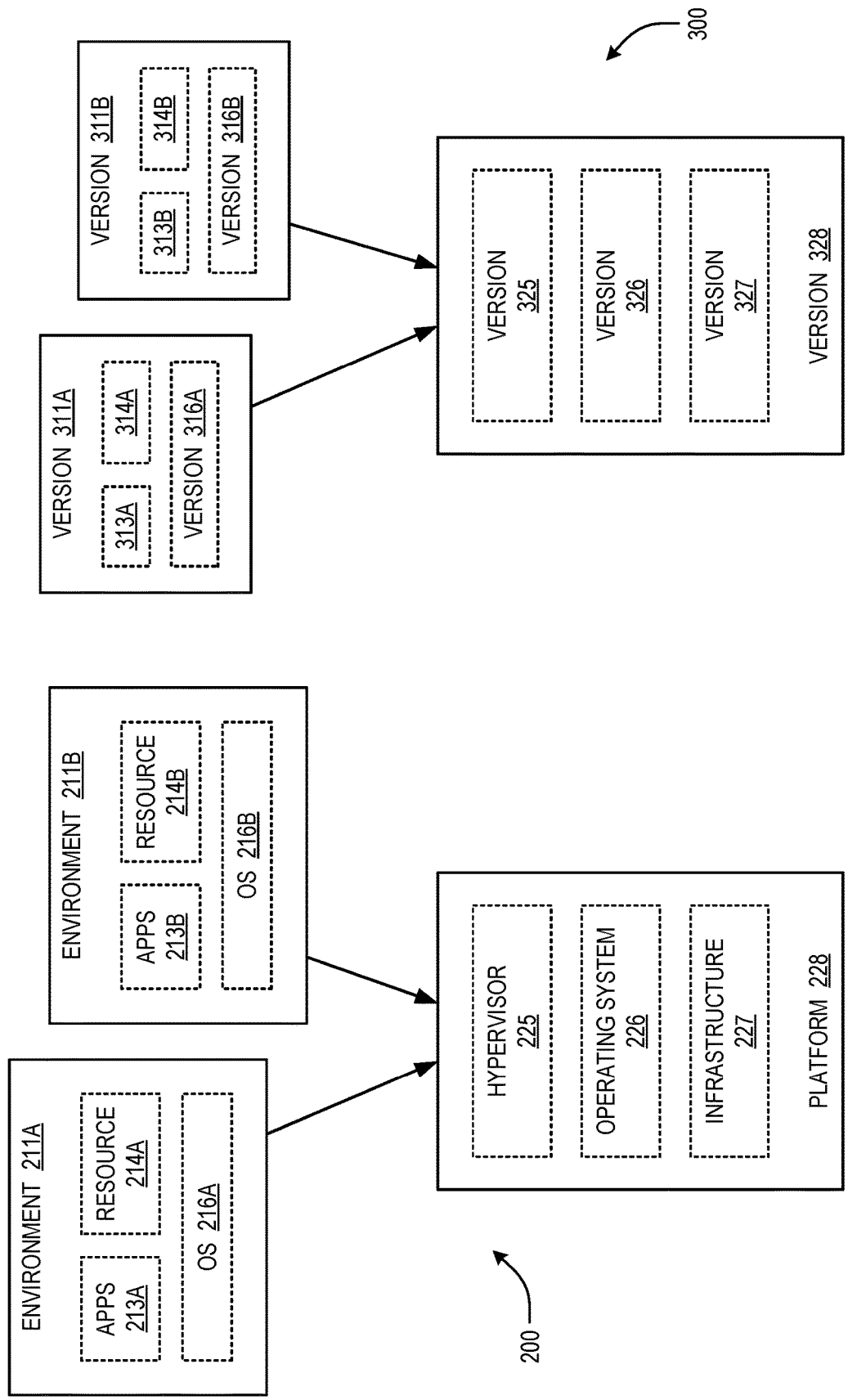

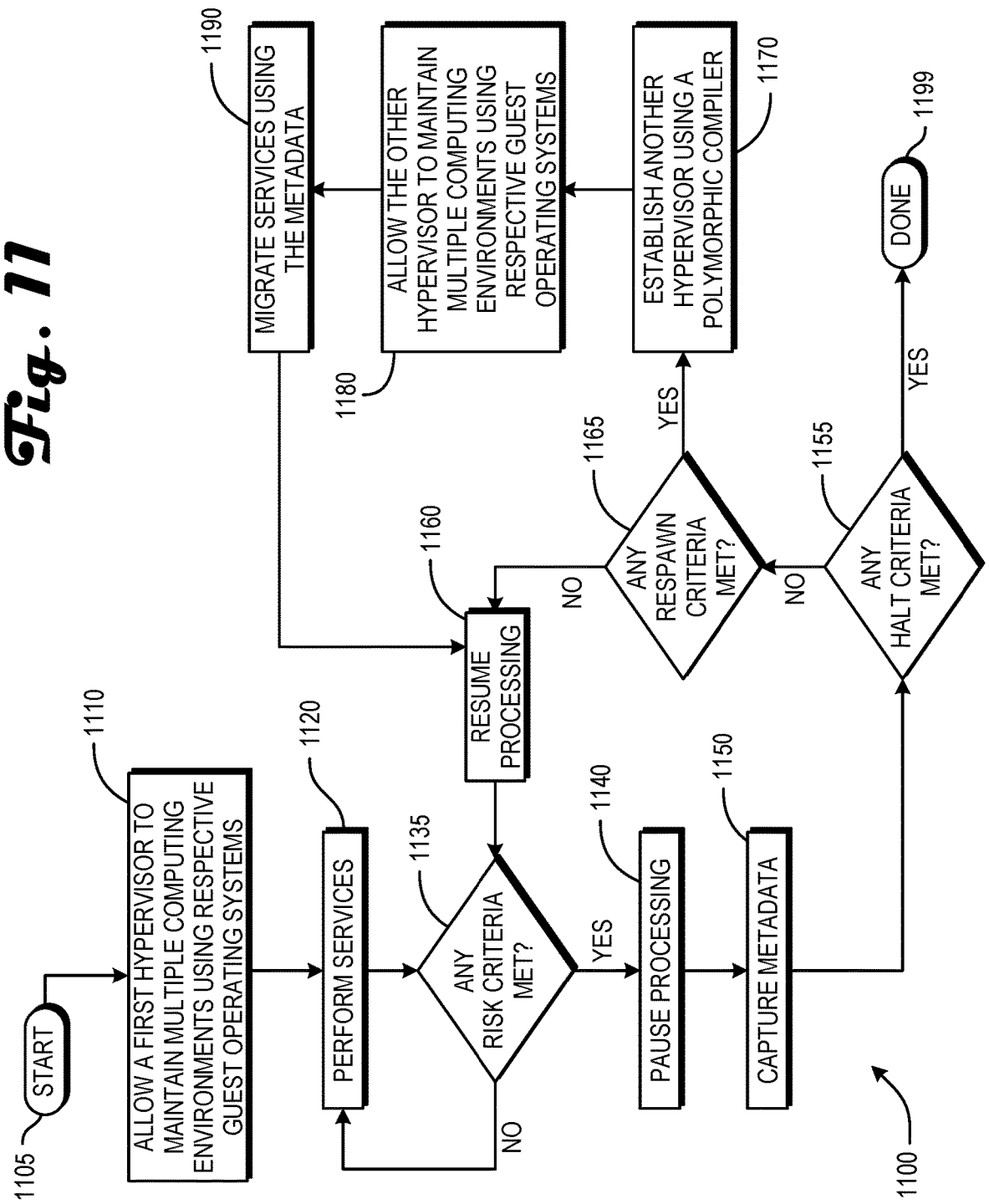

COMPUTING ENVIRONMENT MULTI-ALIASING SYSTEMS AND METHODS

RELATED APPLICATIONS

This application is related to U.S. application Ser. No. 17/367,628 titled "CODE SNIPPET MOBILIZATION SYSTEMS AND METHODS" and filed 6 Jul. 2021.

BRIEF DESCRIPTION OF THE DRAWINGS

FIGS. 2-3 depict further salient aspects of virtualizations in which one or more improved technologies may be incorporated.

FIG. 11 depicts an operational flow in which one or more improved technologies may be incorporated.

DETAILED DESCRIPTION

Figure 1:
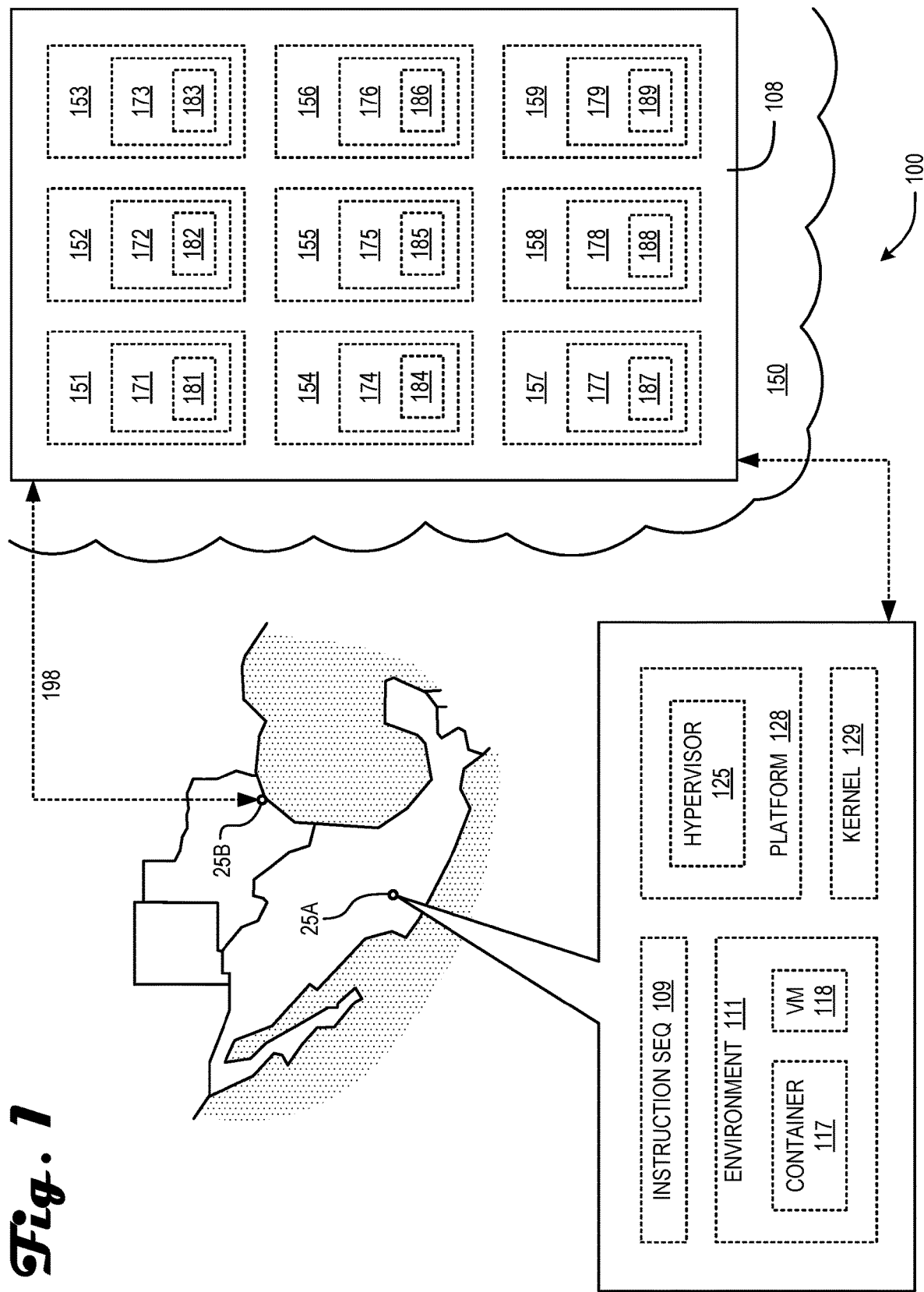
FIG. 1 depicts a system implementing virtualization in which one or more security enhancements may be implemented on one or both sides of an international border.

The detailed description that follows is represented largely in terms of processes and symbolic representations of operations by conventional computer components, including a processor, memory storage devices for the processor, connected display devices, and input devices. Furthermore, some of these processes and operations may utilize conventional computer components in a heterogeneous distributed computing environment, including remote file servers, computer servers, and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. "Actual," "after," "aliased," "alphanumeric," "application-specific," "apparent," "associated," "automatic," "based," "between," "binary," "caused," "compiled," "component," "comprising," "computing," "conditional," "configured," "conjoining," "corresponding," "defined," "detected," "enabled," "established," "executable," "expressed," "first," "identified," "implemented," "in," "indicative," "invoked," "jointly," "manifested," "monitored," "new," "next," "obtained," "operational," "other," "particular," "performed," "polymorphed," "probabilistic," "protected," "public," "recent," "remote," "responsive," "safer," "second," "signaled," "so as," "spawned," "special-purpose," "subsequent," "suitable," "supported," "symptomatic," "then," "third," "translated," "triggered," "virtualized," "wherein," "without," or other such descriptors herein are used in their normal yes-or-no sense, not merely as terms of degree, unless context dictates otherwise. In light of the present disclosure, those skilled in the art will understand from context what is meant by "remote" and by other such positional descriptors used herein. Likewise they will understand that "aliasing" refers herein to a class of security protocols that includes polymorphic compilation and similar randomization but not mere virtualization, filtering, or error response protocols. Likewise they will understand what is meant by "partly based" or other such descriptions of dependent computational variables/signals. "Numerous" as used herein refers to more than one dozen. "Instantaneous" as used herein refers to having a duration of less than 0.1 seconds unless context dictates otherwise. "Immediate" as used herein refers to having a duration of less than 2 seconds unless context dictates otherwise. Circuitry or data items are "onboard" as used herein if they are aboard a vehicle or denoting or controlled from a facility or feature incorporated into the main circuit board of a computer or computerized device unless context dictates otherwise. Circuitry is "invoked" as used herein if it is called on to undergo voltage state transitions so that digital signals are transmitted therefrom or therethrough unless context dictates otherwise. Software is "invoked" as used herein if it is executed/triggered unless context dictates otherwise. One number is "on the order" of another if they differ by less than an order of magnitude (i.e., by less than a factor of ten) unless context dictates otherwise. As used herein "causing" is not limited to a proximate cause but also enabling, conjoining, or other actual causes of an event or phenomenon.

Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

As used herein an "instance" of a thing may include a perfect copy. A copied "instance" of a digital object, for example, may become a new version by being modified or created so as to differ in composition from the prior version. Not every new instance qualifies as a new "version," but every first and second versions of a digital object differ in composition. As used herein a "version" of a digital object refers to a variant having partial structural identicality with the object or partial functional identicality with the object (or both). For example, two "versions" of semicolons may exist in respective programming languages if at least one rule applicable to one does not apply to the other. As used herein a modification of a digital item is "facilitated" by triggering, enabling, defining, signaling, or causing the modification (or a combination of these).

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 schematically illustrates salient aspects of one or more distributed or other data-handling systems 100 configured to facilitate international monitoring and comprising transistor-based circuitry 108 in one or more data networks 150, in which one or more technologies may be implemented. As shown a client device or other hardware-implemented support interface 25A in Mexico may interact with another hardware-implemented support interface 25B in Texas via one or more communication channels 198 therebetween. In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any session parameters or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover, many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Such circuitry 108 may comprise one or more integrated circuits (ICs), for example, optionally mounted on one or more circuit boards. Whether implemented in a distributed cloud or within one or more interfaces 25A-B or other devices described herein, transistor-based circuitry 108 comprises an event-sequencing structure generally as described in U.S. Pat. Pub. No. 2015/0094046 but configured as described herein. Transistor-based circuitry 108 may (optionally) include one or more instances of invocation modules 161 configured to invoke one or more other modules 162-169 configured to perform a function, for example, each including an electrical node set 171 upon which informational data is represented digitally as a corresponding voltage configuration 181. (It deserves emphasis that when a user or other signal originator "invokes" one or more modules 162-169 configured to perform a function, other circuitry along the signal path will also typically "invoke" circuitry downstream configured to perform that function, in a cascading fashion.)

Transistor-based circuitry 108 may likewise include one or more instances of interface modules 162 configured for triggering remote or other processing, each including an electrical node set 172 upon which informational data is represented digitally as a corresponding voltage configuration 182. Transistor-based circuitry 108 may (optionally) likewise include one or more instances of (memory map or other) randomization modules 163 configured for triggering local or other processing, each including an electrical node set 173 upon which informational data is represented digitally as a corresponding voltage configuration 183. Transistor-based circuitry 108 may likewise include one or more instances of (forensic or other processing) suspension modules 164 configured for triggering local or other processing, each including an electrical node set 174 upon which informational data is represented digitally as a corresponding voltage configuration 184. Transistor-based circuitry 108 may likewise include one or more instances of (event or other pattern) recognition modules 165 configured for triggering local or other processing, each including an electrical node set 175 upon which informational data is represented digitally as a corresponding voltage configuration 185. Transistor-based circuitry 108 may likewise include one or more instances of extraction modules 166 configured for triggering local or other processing, each including an electrical node set 176 upon which informational data is represented digitally as a corresponding voltage configuration 186. Transistor-based circuitry 108 may likewise include one or more instances of control modules 167 configured for triggering local or other processing, each including an electrical node set 177 upon which informational data is represented digitally as a corresponding voltage configuration 187. Transistor-based circuitry 108 may likewise include one or more instances of response modules 168 configured for triggering local or other processing, each including an electrical node set 178 upon which informational data is represented digitally as a corresponding voltage configuration 188. Transistor-based circuitry 108 may likewise include one or more instances of implementation modules 169 configured for triggering local or other processing, each including an electrical node set 179 upon which informational data is represented digitally as a corresponding voltage configuration 189. In some variants, for example, a server or other support interface 25A-B in one country may manifest one or more instances of instruction sequences 109, of virtualization or other computing environments 111 (e.g. comprising one or more virtual containers 117 or virtual machines), or of hypervisors 125 or other components that device a platform 128 or kernel 129 (or both). However such circuitry 108 is installed or arranged it will be understood that reconfiguring the arrangement for convenient performance or geography is contemplated as described herein according to the scope and spirit of respective inventions described.

FIG. 2 schematically illustrates another system 200 in which one or more technologies may be implemented, for example, one or more of which may be instantiated within or otherwise interact within the system 100 of FIG. 1. A platform 228 of system 200 as shown may include one or more instances of hypervisors 225, of host operating systems 226, or of other components of infrastructure 227. When deployed platform 228 may (optionally) be configured to support two or more virtual environments 211A-B within which one or more apps 213A-B or other resources 214A-B are each supported by one or more corresponding guest operating systems 216A-B as shown. One skilled in the art will understand that in some contexts an instance of system 200 may include one or more additional virtual environments 211 although they are not shown.

FIG. 3 schematically illustrates another system 300 in which one or more technologies may be implemented as an adaptation, for example, of the system 200 of FIG. 2. Another version 328 of platform 228 as shown may include one or more versions 325 of hypervisors 225 or other such hosting engines. Alternatively or additionally, version 328 may comprise one or more versions 326 of operating systems 226 or one or more versions 327 of infrastructure 227 (or both) of which some or all may differ from that of FIG. 2. Likewise when deployed platform version 328 may (optionally) be configured to support two or more virtual environment versions 311A-B within which one or more application versions 313A-B or other resource versions 314A-B are each supported by one or more corresponding guest operating system versions 316A-B as shown. Such terminology and depiction can be useful, for example, for describing a relationship between a machine language (expression of a) hypervisor 225 and a corresponding source code version 325. Other such reasons for highlighting a similarity between system 200 and system 300 will become clearer as described below, particularly with regard to descriptions of FIGS. 9-11 and annotated numbered clauses thereafter. In some contexts an instance of system 300 may include one or more other virtual environment versions 311 although they are not shown.

Figure 4:
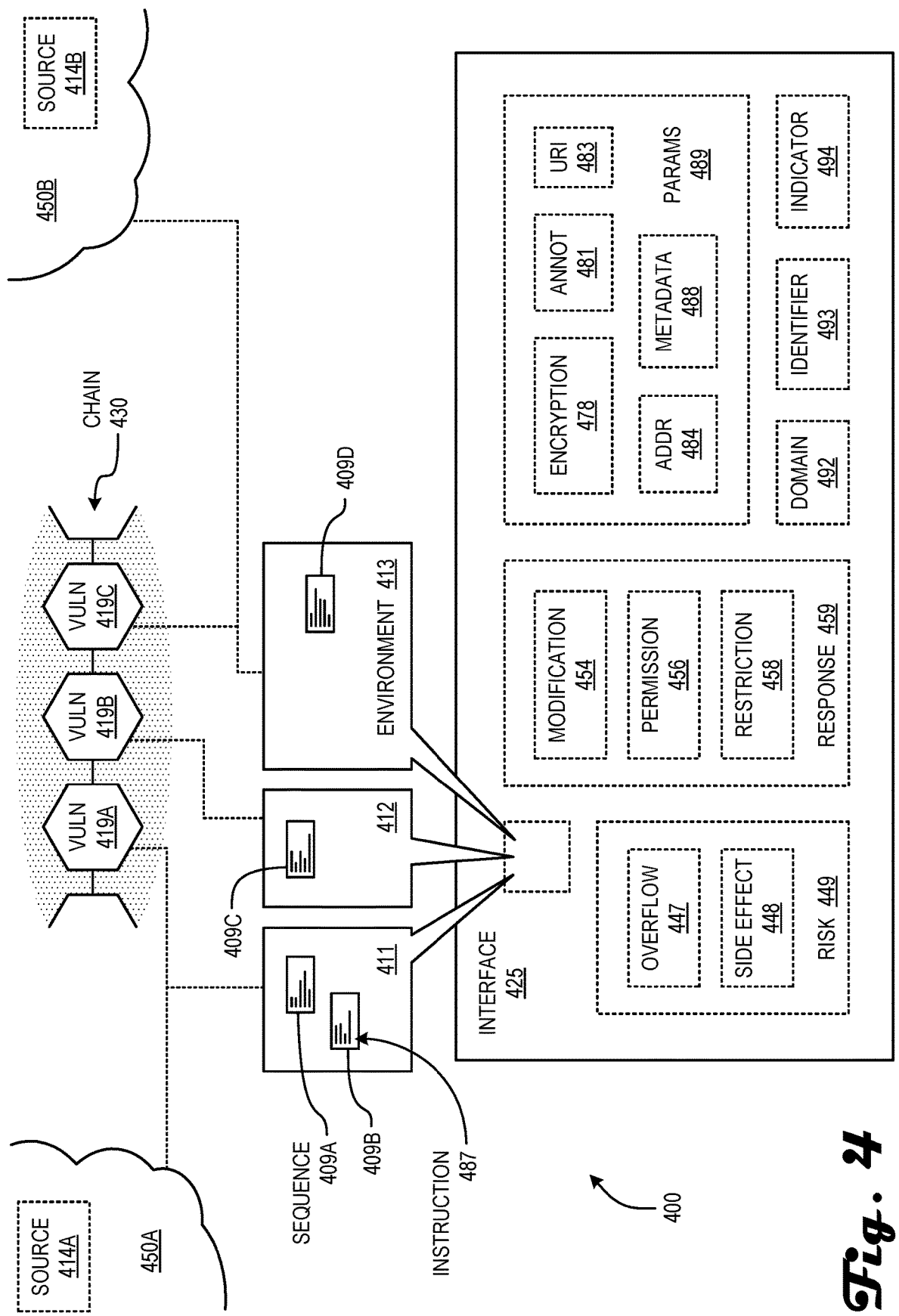
FIG. 4 depicts additional aspects of virtualization in which one or more security enhancements may be implemented.

FIG. 4 schematically illustrates a system 400 in which one or more technologies may be implemented, for example, incorporating one or more of the above-described systems 100, 200, 300. A support interface 425 (e.g. a hypervisor 125, 225) is configured to allow instruction sequences 409A-D to be executed in relative safety from conventional attacks by virtue of separations between respective virtual environments 411-413 as shown. But a higher degree of monitoring or other security may be needed to counter or even detect a more insidious attack, for example, devised by an artificial intelligence or other augmented adversary.

As shown a highly regarded source 414A (e.g. a first trusted programmer operating in a first network 450A) is known to have provided safe and reliable code over the course of years and has also provided one or more instruction sequences 409A-B that manifest an intentional or other subtle vulnerability 419A. Likewise another trusted source 414B in another network 450B is known to have created or validated one or more other instruction sequences 409D containing an undetected vulnerability 419C, intentionally or otherwise. And it is posited that a coordinated action by a multi-stage attack chain 430 may be effective for breaching a system 400 notwithstanding the separations between respective virtual environments 411-413.

Such breaches may manifest as one or more instances of a detectable risk 449 (e.g. an anomaly such as an overflow 447 or unexpected side effect 448). This can occur, for example, in a context in which one or more selective modifications 454, permissions 456, restrictions 458, or other strategic responses 459 to such risks 449 are associated with one or more operating parameters 488, domains 489, indicators 491, or identifiers 493 as described below. Such parameters 488, for example, may include one or more instances of encryptions 478, uniform resource identifiers 483, universal resource locators 484, or other addresses 485, or other metadata 486 pertaining to an instruction sequence or other operation described herein.

In some inventive methods described herein, for example, an operating system 216A is established in a virtual environment 411 and another operating system 216B is established in a virtual environment 412. Both are monitored by a (hypervisor 125 or other) support interface 425 so that a service runs in each of the respective computing environments 411, 412. The first support interface 425 is allowed to pause the service running in the first virtual environment in a particular operational state so that an operating parameter 488 relating to the first computing environment 411 characterizes the particular operational state 1085B. This can occur, for example, in a context in which a control module 167 comprises a polymorphic compiler that does not allow or contain any execution sequence jump instruction 487 that points outside the build environment 111; in which the build environment 111 is configured to generate the polymorphed version 325 using a polymorphic compiler; in which the paused process is migrated to a new virtual environment monitored by a polymorphed version 325 of the support interface 425 in response to an appropriate signal; in which the polymorphed version 325 of the support interface 425 effectively severs the attack chain 430; and in which a risk 449 of undetected vulnerabilities 419A-C in an attack chain 430 would otherwise require a support interface user to fork the code base and absorb all subsequent source code maintenance costs.

Figure 5:
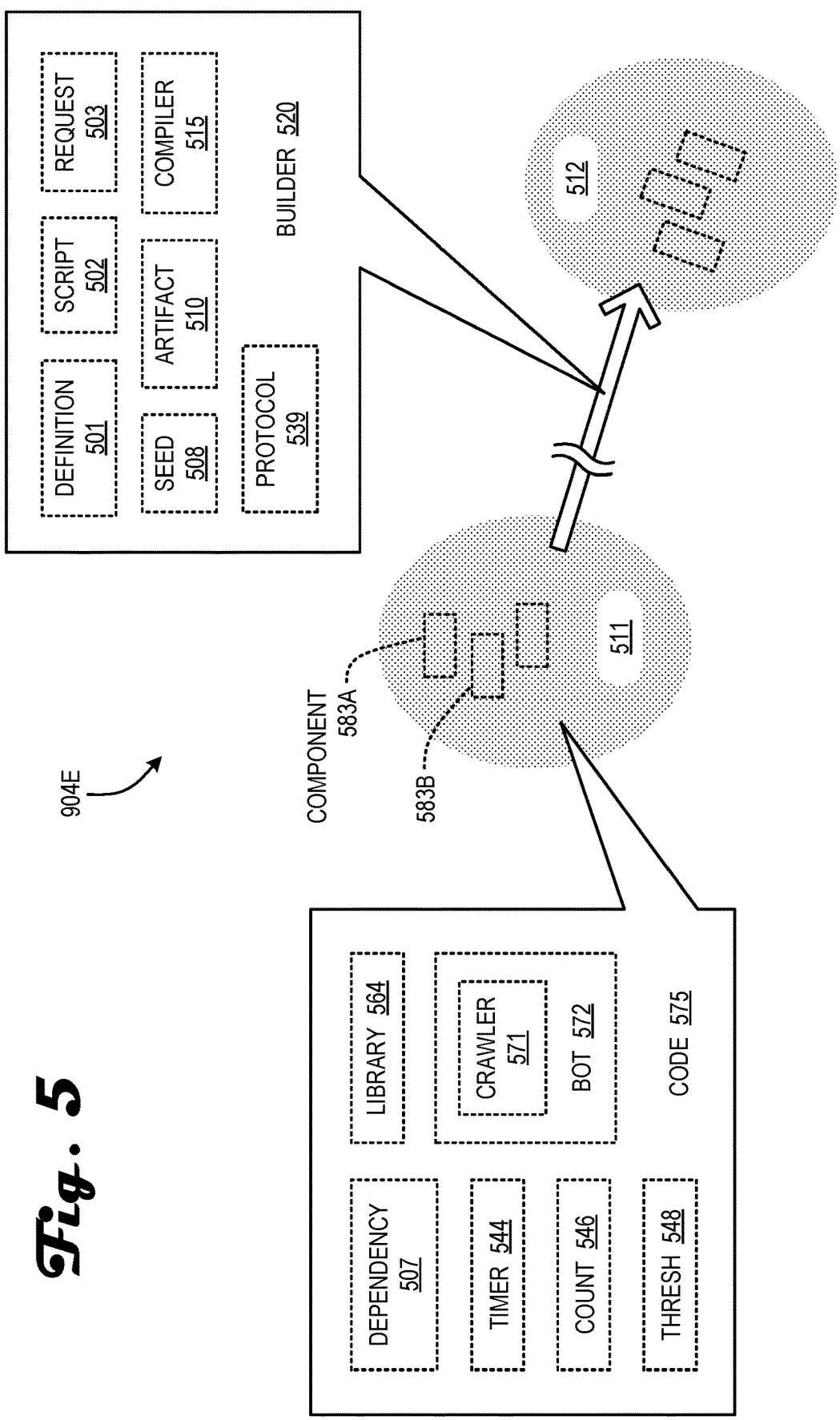
FIG. 5 schematically depicts salient aspects of a code migration in which one or more technologies may be implemented.

FIG. 5 schematically depicts salient aspects of a code migration in which one or more technologies may be implemented. This can occur, for example in a context in which one or more builders 520 implements a migration of some or all components 583A-B in a build environment 111, 511 are aliased one or more times as they are established (through one or more stages) in one or more respective destination environments 512 of each. In some contexts code 575 of a build environment 111, 511 may include one or more instances of dependencies 507 upon external resources; of timers 544, counts 546 or thresholds 548 used in assessing risk 449; of libraries 564 or other binary resources 214 to be migrated; of memory or internet protocol (IP) addresses 568; of crawlers 571 or other bots 572 that detect and aggregate resources; or of other such build environment features and tools described hererin.

Alternatively or additionally, such features and tools may comprise a builder 520 as described herein. Theses may include one or more instances of definitions 501 and other components of a script 502; of requests 503; of seeds 508; of artifacts 510, of compilers 515; or of protocols 539. Preparing for such migration may, for example, include establishing (a version 316A of) an operating system 216A in a first computing environment 411 monitored by a support interface 25A and (a version 316B of) another operating system 216B in a second computing environment 412 also monitored by the first support interface 25A as further described below. Executing the migration may include establishing a second support interface 25B governing one or more destination environments 512 so that service disruption during the migration is minimized.

Figure 6:
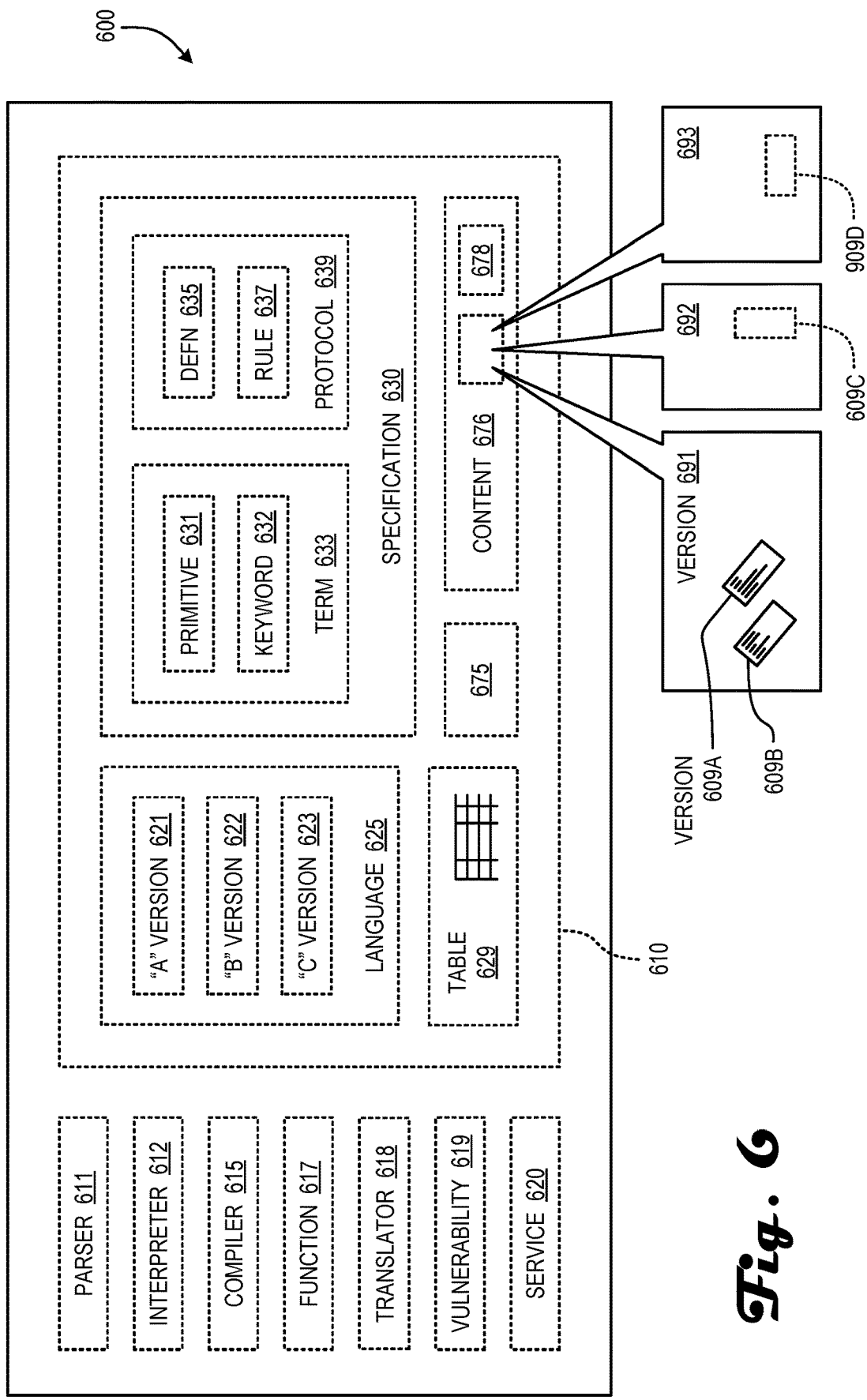
FIG. 6 depicts informational data borne by one or more data-handling media in which one or more improved technologies may be incorporated.

FIG. 6 schematically illustrates one or more memories or other data-handling media 600 comprising one or more instances of parsers 611, of interpreters 612, of compilers 615, of functions 617, of translators 618, of vulnerabilities 619, of services 620, or of other such data items in which one or more technologies may be implemented more safely. In some contexts, for example, such items may include various versions 621-223 of polyscripted or other expressions of systematically diversified programming languages 625 each at least partly defined by a respective (instance of a) language specification 630. Most or all primitives 631, keywords 632, or other terms 633 of each such language 625 described herein correspond to one or more instances of definitions 635, of rules 637, or of other protocols 639 of parsing, for example. Such relationships may be manifested in one or more dictionaries or other tables 629, in programming code 675, or in other content 676 such as polyscripting or other aliasing 678. As used herein terms like "safer" describe a software object relative to another object, signaling that the software object lacks one or more (actual or apparent) attack-vector-vulnerabilities of the other object. In some instances 610 of digital content as described below, moreover, a version 611 of an (original or other) early/prior environment 411 may be polyscripted or otherwise aliased such that respective instruction sequences 409A-B of the early/prior environment 411 may be migrated to become respective aliased versions 609A-B in a later version 611 of the early/prior environment 411. Likewise an instruction sequence 409C in a second environment 412 may be aliased using a different protocol during migration to become a differently aliased instruction sequence 409C in a second environment 412. In this way even if all remaining instruction sequences 409C are simply migrated each to a corresponding new virtual environment 413 an effectively severed attack chain 430 is made more likely and one or more such instruction sequences 409 is made safer than it would otherwise be.

Figure 7:
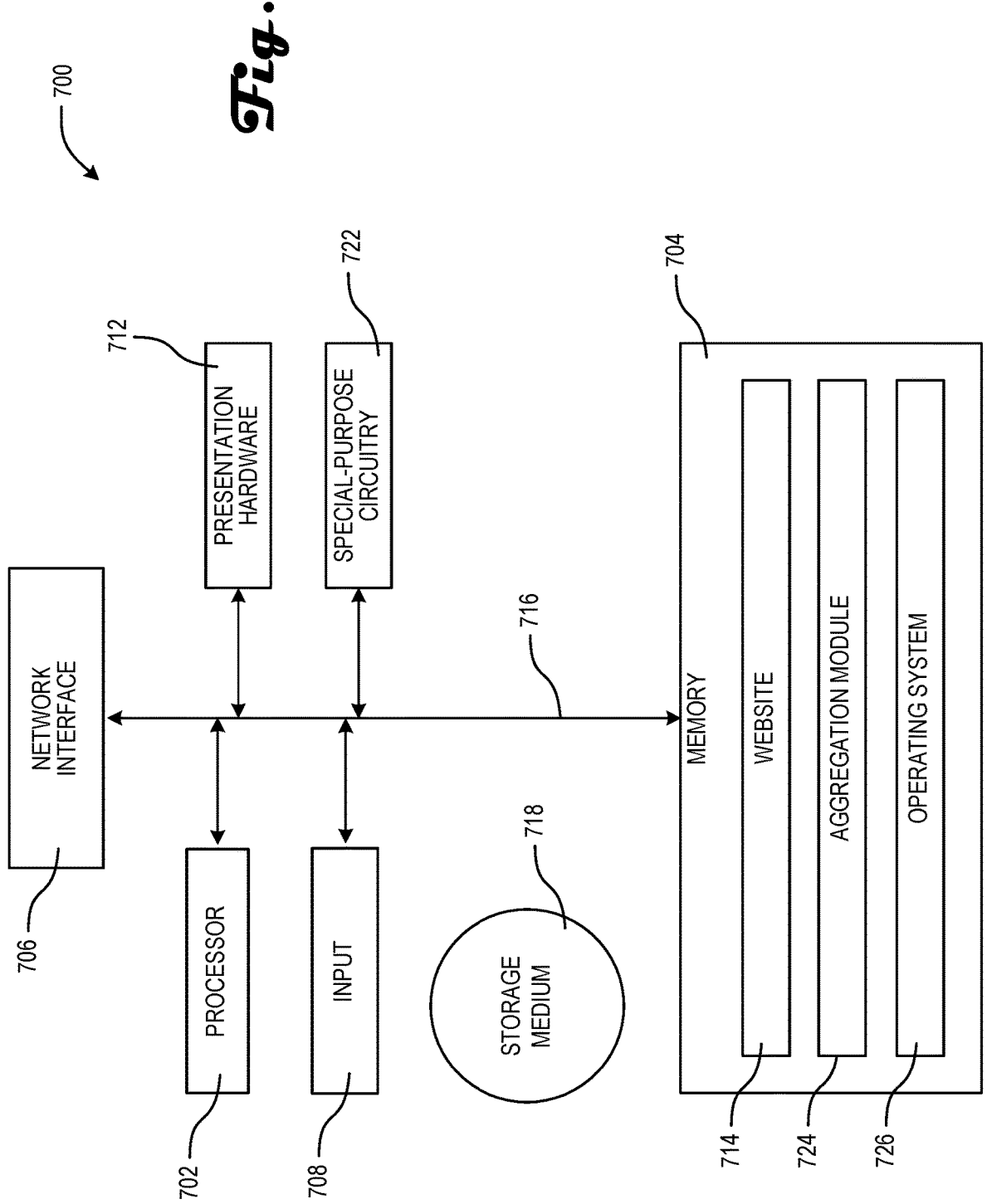
FIG. 7 schematically depicts a server in which one or more improved technologies may be incorporated.

Referring now to FIG. 7, there is shown a server 700 in which one or more technologies may be implemented. Server 700 may include one or more instances of processors 702, of memories 704, user inputs 708, and of (speakers or other) presentation hardware 712 all interconnected along with the network interface 706 via a bus 716. One or more network interfaces 706 allow server 700 to connect via the Internet or other networks 150). Memory 704 generally comprises a random-access memory ("RAM"), a read only memory ("ROM"), and a permanent mass storage device, such as a disk drive.

Memory 704 may contain one or more instances of websites 714, of aggregation modules 724, or of operating systems 726. These and other software components may be loaded from a non-transitory computer readable storage medium 718 into memory 704 of the server 700 using a drive mechanism (not shown) associated with a non-transitory computer readable storage medium 718, such as a floppy disc, tape, DVD/CD-ROM drive, flash card, memory card, or the like. In some embodiments, software or other digital components may be loaded via the network interface 706, rather than via a computer readable storage medium 718. Special-purpose circuitry 722 may, in some variants, include some or all of the event-sequencing logic described herein. In some embodiments server 700 may include many more components than those shown in FIG. 7, but it is not necessary that all conventional components of a server be shown in order to disclose an illustrative embodiment.

Figure 8:
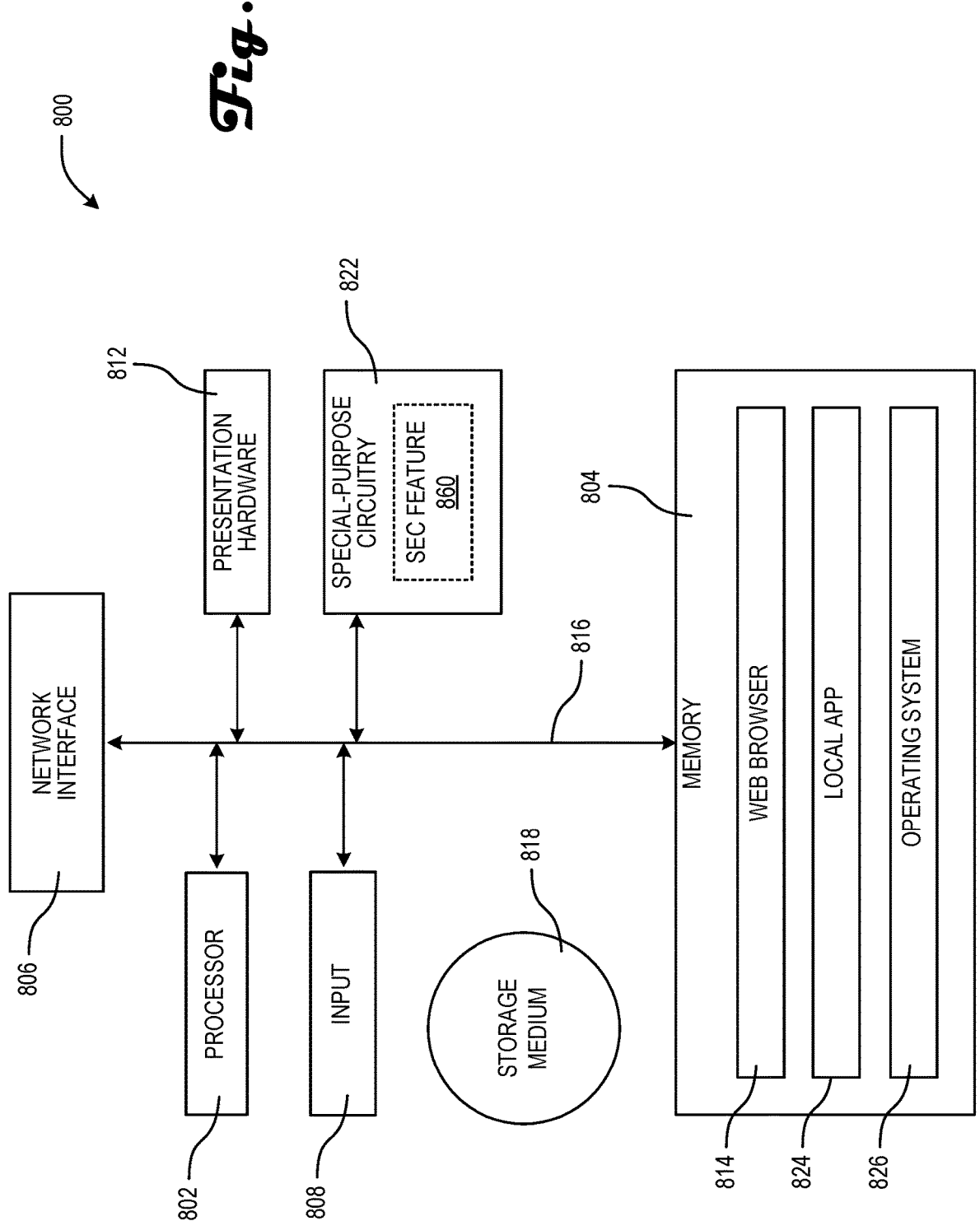
FIG. 8 schematically depicts a client device in which one or more improved technologies may be incorporated.

Referring now to FIG. 8, there is shown a client device 800 in which one or more technologies may be implemented. Device 800 may include one or more instances of processors 802, of memories 804, user inputs 808, and of (speakers or other) presentation hardware 812 all interconnected along with the network interface 806 via a bus 816. One or more network interfaces 806 allow device 800 to connect via the Internet or other networks 150). Memory 804 generally comprises a random-access memory ("RAM"), a read only memory ("ROM"), and a permanent mass storage device, such as a disk drive.

Memory 804 may contain one or more instances of web browsers 814, of local apps 824, or of operating systems 826. These and other software components may be loaded from a non-transitory computer readable storage medium 818 into memory 804 of the device 800 using a drive mechanism (not shown) associated with a non-transitory computer readable storage medium 818, such as a floppy disc, tape, DVD/CD-ROM drive, flash card, memory card, or the like. In some embodiments, software or other digital components may be loaded via the network interface 806, rather than via a computer readable storage medium 818. Special-purpose circuitry 822 may, in some variants, include some or all of the event-sequencing logic described herein. In some embodiments device 800 may include many more components than those shown in FIG. 8, but it is not necessary that all conventional components of a server be shown in order to disclose an illustrative embodiment.

Figure 9:
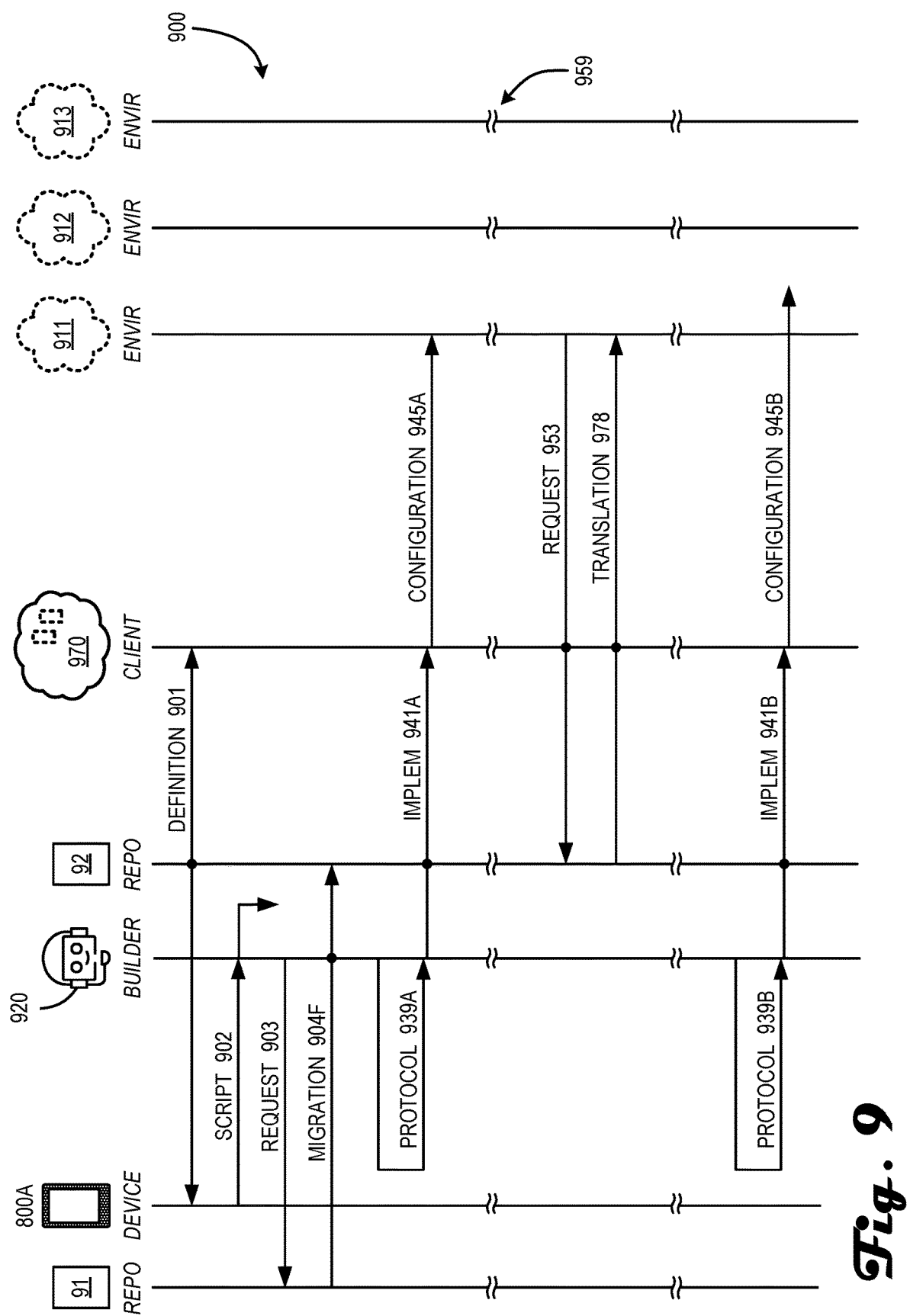
FIG. 9 depicts a flow diagram in which one or more improved technologies may be incorporated.

FIG. 9 depicts a data flow 900 and particular scenario in which one or more improved technologies may be incorporated. A provider uses device 800A to resolve a project definition 901 in cooperation with (a network or other domain of) a destination client 970 and one or more secure repositories 92. One or more scripts 902 that manifest the project definition 901 are thereafter executed by one or more builders 920, triggering a request 903 to one or more external repositories 91 from which there is a migration 904 (e.g. of one or more missing components 583) to the one or more secure repositories 92. The one or more scripts 902 are also configured to implement an aliasing or other security protocol 939A by which an implementation 941A is performed that causes client 970 to perform a configuration 945A upon (at least) a first virtual environment 911. After some delay 959 a request 953 (e.g. for physical resource access such as data from repository 92) is received from environment 911, which request is examined via client 970 as shown to ascertain whether any recognizable side effects 448 or other indicia of risk 449 are present. If not a response 459 to the request 953 (e.g. a translation 978) is returned to environment 911. After additional delay 959 signaling one or more spawning criteria eventually being met (e.g. as detected by a recognition module 165) the one or more scripts 902 may also implement an aliasing or other security protocol 939B by which an implementation 941B occurs by which client 970 causes a configuration 945B of one or more additional virtual environments 912, 913 as described below.

Figure 10:
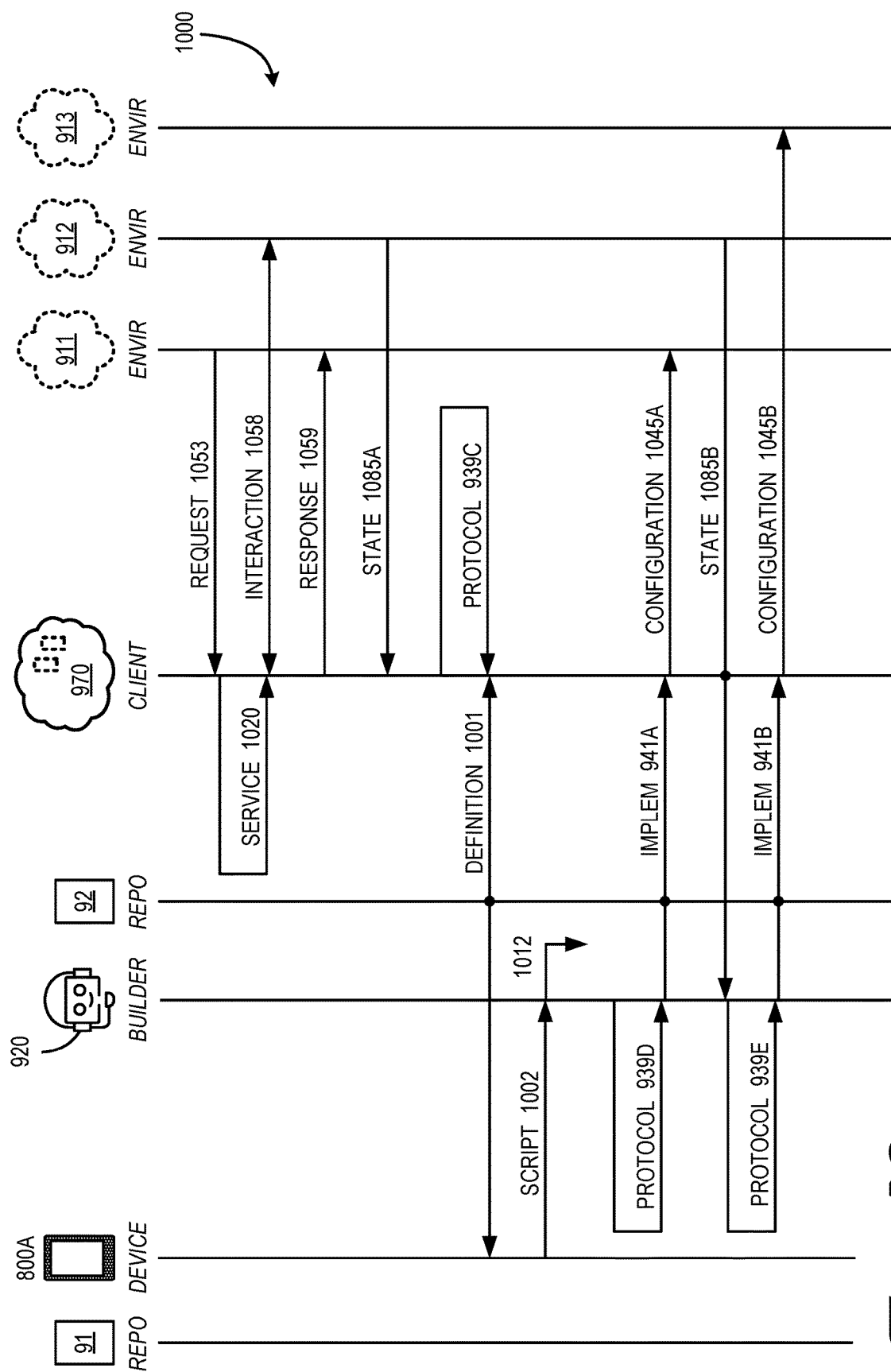
FIG. 10 depicts another flow diagram in which one or more improved technologies may be incorporated.

FIG. 10 depicts another data flow 1000 and particular scenario in which one or more improved technologies may be incorporated. A request 1053 (e.g. for interaction with one or more services 620 of environment 912) is received from environment 911, which request is examined via client 970 as shown (e.g. as service 1020) to ascertain whether any recognizable side effects 448 or other indicia of risk 449 are present. If not an interaction 1058 between client 970 and (one or more services 620 in) environment 912 occurs, permitting one or more responses 459, 1059 to be returned to the environment 911 from which the request 1053 originated. During that interaction 1058 or thereafter, (one or more services of) environment 912 also provides (one or more parameters 488 indicative of) state 1085A as shown. See FIG. 11.

FIG. 11 illustrates an operational flow 1100 suitable for use with at least one embodiment, such as may be performed on a server 700 or client device 800 (or both) using special-purpose circuitry 722, 822 thereof. As will be recognized by those having ordinary skill in the art, not all events of information management are illustrated in FIG. 11. Rather, for clarity, only those steps reasonably relevant to describing the security-enhanced computing interaction aspects of flow 1100 are shown and described. Those having ordinary skill in the art will also recognize the present embodiments are each merely one exemplary embodiment and that variations thereof may be made without departing from the scope of the broader inventive concept set forth in the clauses and claims below.

Operation 1110 describes allowing a first hypervisor to maintain multiple computing environments using respective guest operating systems (e.g. one or more implementation modules 169 triggering, enabling, or otherwise selectively allowing a hypervisor 125 to maintain multiple computing environments 411, 412, 413 that each use one or more respective guest operating systems 216 or adapted versions 316 thereof). This can occur, for example, in a context in which one or more of the above-described systems 100, 200, 300, 400 are operably instantiated in or otherwise accessible to one or more build environments 111, 511 described herein and in which one or more compilers 515, 615 described herein are thus configured to generate a security-enhanced hypervisor 125 using a polyscripting or other security enhancement protocol 539 upon open source or other well-vetted hypervisor source code 675. Alternatively or additionally, some instances of operation 1110 may be performed upon a conventional instance of a hypervisor 125 to protect content 676 or other resources 214A-B in such environments 411, 412, 413 that would otherwise be subject to an attack chain 430 that is carefully orchestrated over time.

Operation 1120 describes performing services (e.g. one or more virtual machines or other components 583A-B performing user-requested application functions 617 or other such services 620 in the above-described computing environments 411, 412). This can occur, for example, in a context in which such computing environments 411, 412 are instances of containers 117 or virtual machines 118; in which one or more control modules 167 likewise each "perform" an instance of operation 1120 by triggering such components 583A-B to perform operation 1120; in which hypervisor 125 comprises (human-unreadable) binary device-executable code such as machine language; and in which hypervisor 125 controls/monitors at least some such computing environments 411, 412 simultaneously and selectively.

Operation 1135 describes determining whether one or more risk criteria are met (e.g. one or more recognition modules 166 detecting an error message, warning, or other indicator 491 that a risk 449 has been detected). This can occur, for example, in a context in which the indicator 491 is Boolean; in which the applied risk criteria include one or more stack overflows 447 or other computational side effects 448 (or both). If no such risk criteria are detected/apparent, flow returns to operation 1120 so that one or more processes that support such service(s) can occur/continue. But if one or more such risk criteria are detected/apparent, flow continues to operation 1140.

Operation 1140 describes pausing processing (e.g. one or more control modules 167 signaling or otherwise causing hypervisor 125 to pause an application function 617 or other service 620 in a first operational state 1085A in the first computing environment 411). This can occur, for example, in a context in which in which such a control module 167 exists within or is otherwise operably coupled to hypervisor 125. Flow then passes to operation 1150.

Operation 1150 comprises capturing metadata (e.g. an extraction module 166 obtaining a memory address 485 or other metadata 486 characterizes the state 1085 of a service 620 or other resource 214). This can occur, for example, in a context in which service 620 is running on a first operating system 216A monitored by hypervisor 125 so that an operating parameter 488 (from or otherwise) relating to the first computing environment 411 characterizes the first operational state 1085. Alternatively or additionally such an extraction module 166 may obtain such operating parameters 488 from a pattern recognition module 165 that detected one or more error events that signaled a potential vulnerability 419, 619 at operation 1135. Flow then passes to operation 1155.

Operation 1155 describes determining whether one or more operational termination/halt criteria are met (e.g. another instance of a recognition module 166 detecting a catastrophic failure or other indicator 491 of a serious risk 449). This can occur, for example, in a context in which the indicator 491 is Boolean; in which one or more applied termination/halt criteria include an expanding attacker permission 456 or host privilege restriction 458 or other such modification 454 apparently in response 459 an attack or attack chain 430. If any such termination/halt criteria are detected/apparent, flow terminates at operation 1199. But if no such termination/halt criteria are detected/apparent, flow continues to operation 1165.

Operation 1165 describes determining whether one or more respawn criteria are met (e.g. yet another instance of a recognition module 166 detecting a maintenance timer 544 or other event count 546 reaching a threshold 548 that has been associated with prospective migration to a next hypervisor 225). This can occur, for example, in a context in which one or more such thresholds 548 or other migration criteria are selected at inception by a system administrator or installation technician; in which the indicator 491 is Boolean; in which one or more applied respawn criteria include a transaction or usage count 546 or similar indicated expenditure of resources 214; in which no catastrophic failure is required for such a migration to occur; and in which a particular attack chain 430 would otherwise result in a successful service interruption. If no such respawn criteria are detected/apparent, flow continues to operation 1160. But if any such respawn criteria are detected/apparent, flow continues to operation 1170.

Operation 1170 comprises establishing an other hypervisor using a polymorphic compiler (e.g. an implementation module 169 responding to the event count 546 reaching a migration-indicative threshold 548 by signaling one or more compilers 515, 615 to generate a next hypervisor 225). This can occur, for example, in a context in which the before and after hypervisors 125, 225 are respective compilations of exactly the same revision of hypervisor source code 675 and in which a difference between the before and after hypervisors 125, 225 results from a corresponding difference between the before/source and after/destination probabilistic probabilistic seed 508 or between the before and after compilation protocol 539 (or both).

Operation 1180 comprises allowing the other hypervisor to maintain multiple computing environments using respective guest operating systems (e.g. another instance of an implementation module 169 allowing the destination hypervisor 225 to maintain at least first and second destination environments 611, 612 that run on respective versions 316A-B of the pre-migration guest operating systems). This can occur, for example, in a context in which a polymorphed second version 316B of the pre-migration first operating system 216A is established in a destination first computing environment 411 monitored by the after/destination hypervisor 225; in which the first destination environment 411 runs on a polymorphic version 316A of the pre-migration guest operating system 216A; and in which such environment-specific polymorphing allows aliased versions 609A-B of upstream components 583A-B would otherwise require expensive analysis to sever one or more latent attack chains 430 alleviated by the environment-specific polymorphing. Alternatively or additionally, a second destination environment 412 may run concurrently on a polymorphic version 316B of another pre-migration guest operating system 216B.

In light of teachings herein, numerous existing techniques may be applied for configuring special-purpose circuitry or other structures effective for securing, monitoring, connecting, analyzing, modeling, translating, recognizing, recording, retrieving, reverting, facilitating, and other operations as described herein without undue experimentation. See, e.g., U.S. patent Ser. No. 10/701,213 ("Dynamically generating an aggregation routine"); U.S. patent Ser. No. 10/416,979 ("Package installation on a host file system using a container"); U.S. patent Ser. No. 10/382,424 ("Secret store for OAuth offline tokens"); U.S. patent Ser. No. 10/360,150 ("Techniques for managing memory in a multiprocessor architecture"); U.S. patent Ser. No. 10/356,155 ("Service onboarding"); U.S. patent Ser. No. 10/339,837 ("Distribution of scrambled binary output using a randomized compiler"); U.S. patent Ser. No. 10/142,453 ("User interface for a computing device"); U.S. patent Ser. No. 10/127,160 ("Methods and systems for binary scrambling"); U.S. patent Ser. No. 10/050,797 ("Inserting snapshot code into an application"); U.S. patent Ser. No. 10/033,604 ("Providing compliance/monitoring service based on content of a service controller"); U.S. Pat. No. 9,923,793 ("Client-side measurement of user experience quality"); U.S. Pat. No. 9,807,077 ("Systems and methods for containerized data security"); U.S. Pat. No. 9,665,474 ("Relationships derived from trace data"); U.S. Pat. No. 9,558,362 ("Data encryption using an external arguments encryption algorithm"); U.S. Pat. No. 9,483,590 ("User-defined application models"); U.S. Pat. No. 9,465,721 ("Snapshotting executing code with a modifiable snapshot definition"); U.S. Pat. No. 9,417,859 ("Purity analysis using white list/black list analysis"); U.S. Pat. No. 9,389,992 ("Multiple tracer configurations applied on a function-by-function level"); U.S. Pat. No. 9,292,415 ("Module specific tracing in a shared module environment"); U.S. Pat. No. 9,286,042 ("Control flow graph application configuration"); U.S. Pat. No. 9,141,502 ("Method and system for providing high availability to computer applications"); U.S. Pat. No. 9,021,445 ("Tracer list for automatically controlling tracer behavior"); U.S. Pat. No. 8,978,016 ("Error list and bug report analysis for configuring an application tracer"); U.S. Pat. No. 8,966,462 ("Memory management parameters derived from system modeling"); U.S. Pat. No. 8,909,546 ("Privacy-centric ad models that leverage social graphs"); U.S. Pat. No. 8,849,968 ("Secure and stable hosting of third-party extensions to web services"); U.S. Pat. No. 8,775,437 ("Dynamic reranking of search results based upon source authority"); U.S. Pat. No. 8,694,574 ("Optimized settings in a configuration database with boundaries"); U.S. Pat. No. 8,656,378 ("Memorization configuration file consumed at compile time"); U.S. Pat. No. 8,656,135 ("Optimized memory configuration deployed prior to execution"); U.S. Pat. No. 8,650,538 ("Meta garbage collection for functional code"); U.S. Pat. No. 8,595,743 ("Network aware process scheduling"); U.S. Pat. No. 8,312,273 ("Privacy vault for maintaining the privacy of user profiles"); U.S. Pat. No. 8,014,308 ("Hardware architecture for cloud services"); and U.S. Pat. Pub. No. 20140274078 ("Protocols for facilitating broader access in wireless communications").

As used herein a "hypervisor" comprises one or more device-executable instruction sequences that create and run containers or other controlled computing environments such as virtual machines 118 (VMs) so as to allow at least one "host" computer (e.g. a server 700 in a standalone or clustered configuration) to support multiple virtual environments concurrently (e.g. by virtually sharing at least one physical processor 702 or physical memory 704 in common therebetween). "Hypervisor" may also refer to source code from which such device-executable instruction sequences are generated.

Although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, all of the words and phrases used will be understood to one of ordinary skill as being either a natural language expression with a plain meaning or a term of art to be construed in light of statements herein. First combinations of aspects and embodiments are articulated in a shorthand form such that (1) according to respective embodiments, for each instance in which a "component" or other such identifiers appear to be introduced (e.g., with "a" or "an,") more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES 1. (Independent) A computing environment aliasing support method (e.g. including one or more data flows 900, 1000 or operational flows 1100 described above) comprising:

invoking transistor-based circuitry (e.g. a builder 1020 or other implementation module 169) configured to establish a first version 316A of a first operating system 216A in a first computing environment 411 (locally or otherwise) monitored by a first support interface 25A (e.g. a hypervisor) and a first version 316B of a second operating system 216B in a second computing environment 412 monitored by the first support interface 25A so that the first version 316A of the first operating system 216A supports a first resource 214A (e.g. one or more application functions 617 of an app 213A or other services 620) in the first computing environment 411;

invoking transistor-based circuitry (e.g. a control module 167) configured to allow the first support interface 25A to advance the first application function 617 to and then (suspend or otherwise) pause the first resource 214A in a particular operational state 1085B in the first computing environment 411 running the first operating system 216A monitored by the first support interface 25A so that a first (breakpoint, line number, memory location, or other) operating parameter 488 (from or otherwise) relating to the first computing environment 411 characterizes the particular operational state 1085B; and invoking transistor-based circuitry (e.g. another instance of an implementation module 169) configured to establish a polymorphed or other aliased second support interface 25B.

2. The computing method of any of the above Clauses wherein the invoking transistor-based circuitry configured to establish the aliased second support interface 25B comprises:

(remotely or otherwise) invoking transistor-based circuitry (e.g. a recognition module 165) configured to detect an event count 546 (crossing or otherwise) reaching a threshold 548 associated (prospectively) with a migration to the polymorphed or other aliased second support interface 25B; and (migrating or otherwise) causing one or more computing environments 411, 412 to be monitored by the second support interface 25B instead of by the first support interface 25A.

3. The computing method of any of the above Clauses wherein the first and second support interfaces 25A-B comprises binary executable code (e.g. respective compiled versions 325 of a hypervisor).

4. The computing method of any of the above Clauses wherein the first and second support interfaces 25A-B each consist of binary executable code.

5. The computing method of any of the above Clauses wherein the first and second support interfaces 25A-B comprise respective (different) instances 610 of binary executable code both derived (e.g. by compilation) from the same source code 575.

6. The computing method of any of the above Clauses wherein the polymorphed or other aliased second support interface 25B comprises a second hypervisor 225.

7. The computing method of any of the above Clauses wherein the polymorphed or other aliased second support interface 25B is operably coupled with another hypervisor.

8. The computing method of any of the above Clauses wherein a containment platform 128 of the first support interface 25A comprises (at least) a first bare metal hypervisor 125.

9. The computing method of any of the above Clauses wherein a containment platform 128 of the first support interface 25A includes a first version 325 of a hypervisor running on a first polymorphed or other aliased version 326 of a host operating system.

10. The computing method of any of the above Clauses wherein a containment platform 128 of the first support interface 25A comprises both a bare metal hypervisor 125 running on a first processor and another hypervisor running on a polymorphed or other aliased version 326 of a host operating system running on a second processor.

11. The computing method of any of the above Clauses wherein (an instance of) a containment platform 128 of the first support interface 25A comprises:

at least one (instance 610 of a) containment platform 128 that supports several guest virtual machines 118 that share at least a first (hardware) processor 602 of a server 600A of the first support interface 25A.

12. The computing method of any of the above Clauses wherein a containment platform 128 of the first support interface 25A comprises:

at least one containment platform 128 that supports several guest virtual machines 118 that share at least a first memory 704 of a client device 700A of the first support interface 25A.

13. The computing method of any of the above Clauses comprising:

configuring a containment platform 228 that includes a hypervisor 225 as the second support interface 25B so that an infrastructure 227 of the containment platform 228 shares (an instance of) a common kernel 129 with one or more application code sequences 109 all running on a single underlying operating system 226.

14. The computing method of any of the above Clauses comprising:

aggregating first application source code in one or more repositories 92;

implementing a first version 609A of a service 620 that includes the first resource 214A in a newer version 611 of the first computing environment by compiling the first application source code of the one or more repositories 92;

implementing a second version 609C of the service 620 in a newer version 612 of the second computing environment also by compiling the first application source code of the one or more repositories 92; and causing the second binary executable code support interface 25B to monitor the newer version 612 of the second computing environment in lieu of the first binary executable code support interface 25A monitoring the newer version 612 of the second computing environment.

15. The computing method of any of the above Clauses comprising:

aggregating first application source code in one or more repositories 92;

implementing a first version 609A of a service 620 in a newer version 611 of the first computing environment by compiling the first application source code of the one or more repositories 92 using a first probabilistic probabilistic seed 508;

implementing a second version 609C of the service 620 in a newer version 612 of the second computing environment by compiling the first application source code of the one or more repositories 92 using a second probabilistic seed 508 (i.e. one that is different than the first probabilistic seed) wherein a difference between the first and second probabilistic seeds 508 causes the first version 609A of the service 620 to differ from the second version 609C of the service 620; and causing the second binary executable code support interface 25B to monitor the second computing environment in lieu of the first binary executable code support interface 25A monitoring the newer version 612 of the second computing environment.

16. The computing method of any of the above Clauses comprising:

aggregating (at least some) first application source code in one or more repositories 92;

implementing a first version 609A of a service 620 in a newer version 611 of the first computing environment by compiling (at least some of) the first application source code of the one or more repositories 92 using a first protocol 539;

implementing a second version 609C of the service 620 in a newer version 612 of the second computing environment by compiling the first application source code of the one or more repositories 92 using a second protocol 539 (i.e. one that is different than the first protocol) wherein a difference between the first and second protocols 539 causes the first version 609A of the service 620 to differ from the second version 609C of the service 620; and causing the second binary executable code support interface 25B to monitor the second computing environment in lieu of the first binary executable code support interface 25A.

17. The computing method of any of the above Clauses comprising:

aggregating first operating system source code 675 in one or more repositories 92;

generating a third operating system 216 in a build environment 111, 511 using the first operating system source code 675 of the one or more repositories 92; and causing the second binary executable code support interface 25B to monitor the third operating system 216 in lieu of the first binary executable code support interface 25A.

18. The computing method of any of the above Clauses comprising:

invoking transistor-based circuitry (e.g. an implementation module 169 and control module 167 jointly) configured to use a second version 316 of the second operating system 216B in a third computing environment 413 monitored by the second binary executable code support interface 25B; and migrating one or more particular services 620 previously performed in the second computing environment 412 so that at least one of the one or more particular services 620 will thereafter be performed in the third computing environment 413 instead.

19. The computing method of any of the above Clauses comprising:

causing a second version 316 of the second operating system 216B to be created via an application of a polymorphic compiler 516, 616 to open-source operating system source code 675;

causing a third computing environment 413 monitored by the second binary executable code support interface 25B to use the second version 316 of the second operating system 216B in a third computing environment 413 monitored by the second binary executable code support interface 25B; and migrating one or more services 620 previously performed in the second computing environment 412 so that the one or more services 620 will be performed in the third computing environment 413 instead.

20. The computing method of any of the above Clauses comprising:

causing one or more services 620 previously performed in one or more firewalled computing environments 411, 412 monitored by the first binary executable code support interface 25A to be performed in one or more computing environments 413 monitored by the second binary executable code support interface 25B instead as an automatic and conditional response 459 to an indicator 491 of a first (privacy breach, spyware vector, or other identifiable) risk 449 that (actually or apparently) relates to the first binary executable code support interface 25A.

21. The computing method of any of the above Clauses comprising:

causing one or more services 620 previously performed in one or more computing environments 411, 412 monitored by the first binary executable code support interface 25A to be performed in one or more computing environments 413 monitored by the second binary executable code support interface 25B instead as an automatic and conditional response 459 to an indicator 491 of a first risk 449 (e.g. of a multi-stage attack chain 430) that relates to the first binary executable code support interface 25A.

22. The computing method of any of the above Clauses comprising:

causing some or all services 620 previously performed in one or more firewalled or other computing environments 411 managed by the first binary executable code support interface 25A to be performed in one or more computing environments 413 monitored by the second binary executable code support interface 25B instead as a conditional response 459 to an indicator 491 of a risk 449 from (at least one of) the one or more firewalled computing environments 411 as a symptom that (actually or apparently) relates to the first binary executable code support interface 25A.

23. The computing method of any of the above Clauses comprising:

causing one or more services 620 previously performed in two or more mutually firewalled computing environments 411, 412 managed by the first binary executable code support interface 25A to be performed in one or more computing environments 413 monitored by the second binary executable code support interface 25B instead as a conditional response 459 to an indicator 491 of a (memory leakage or other identifiable) security risk 449 (e.g. of a multi-stage attack chain 430) as a symptom that relates (directly or otherwise) to the first binary executable code support interface 25A.

24. The computing method of any of the above Clauses comprising:

causing one or more services 620 previously performed in two or more firewalled computing environments 411, 412 monitored by the first binary executable code support interface 25A to be performed in one or more computing environments 413 monitored by the second binary executable code support interface 25B instead as a conditional response 459 to an indicator 491 of a risk 449 (e.g. from at least one of the two or more firewalled computing environments 411, 412) that relates to the first binary executable code support interface 25A.

25. The computing method of any of the above Clauses comprising:

invoking transistor-based circuitry (e.g. a recognition module 165 and control module 167 jointly) configured to allow the first support interface 25A to pause at least the first application function 617 in a prior operational state 1085A in the first computing environment 411 running the first operating system 216A monitored by the first support interface 25A.

26. The computing method of any of the above Clauses comprising:

invoking transistor-based circuitry (e.g. a recognition module 165 and control module 167 jointly) configured to allow the first support interface 25A to pause at least the first application function 617 in a prior operational state 1085A in the first computing environment 411 running the first operating system 216A monitored by the first support interface 25A so that (at least) a prior operating parameter 488 from or otherwise relating to the first computing environment 411 characterizes the prior operational state 1085A.

27. The computing method of any of the above Clauses comprising:

invoking transistor-based circuitry (e.g. another instance of a response module 168 and implementation module 169 jointly) configured to respond (as a restriction 458 or other response 459) to the indicator 491 of a first (apparent or actual) vulnerability 419, 619 by) establishing the second version 316B of the first operating system 216A in a first computing environment 411 monitored by the polymorphed or other aliased second support interface 25B so that the second version 316B of the first operating system 216A supports the second version 314B of the first application function 617 running in the first computing environment 411 monitored by the polymorphed or other aliased second support interface 25B starting from the particular operational state 1085B (at least partly) characterized by the first operating parameter 488.

28. The computing method of any of the above Clauses wherein a first probabilistic seed 508 was used for generating the first support interface 25A; wherein a second probabilistic seed 508 was used for generating the second support interface 25B; and wherein a difference between the first and second support interfaces 25A-B resulted (at least partly) from a difference between the first and second probabilistic seeds 508.

29. The computing method of any of the above Clauses wherein a first protocol 539 was used for generating the first support interface 25A; wherein a second protocol 539 was used for generating the second support interface 25B; and wherein a difference between the first and second support interfaces 25A-B resulted (at last partly) from a difference between the first and second protocols 539.

30. The computing method of any of the above Clauses comprising:
generating the first support interface 25A using a first probabilistic seed 508 and a first protocol 539; and
generating the second support interface 25B using a second probabilistic seed 508 and a second protocol 539 wherein a difference between the first and second support interfaces 25A-B is partly based on a difference between the first and second probabilistic seeds 508 and partly based on a difference between the first and second protocols 539.

31. The computing method of any of the above Clauses wherein the first (machine language or other) binary executable code support interface 25A comprises a (version of a) hypervisor 125.

32. The computing method of any of the above Clauses wherein a first aliasing protocol 539 was used for generating the first support interface 25A; wherein a second aliasing protocol 539 is used for generating the second support interface 25B; and wherein a difference between the first and second support interfaces 25A-B resulted (at least partly) from a corresponding difference between the first and second protocols 539.

33. The computing method of any of the above Clauses wherein an error recognition module 165 obtains one or more operating parameters 488 that characterize the first operational state 1085A in response to a detected indicator 491 of a potential vulnerability 419, 619).

34. The computing method of any of the above Clauses comprising:
automatically establishing the polymorphed or other aliased second support interface 25B as a conditional response 459 (at least) to a first indicator 491 of a first (apparently or actually symptomatic) vulnerability 419, 619.

35. (Independent) A computing environment aliasing support system 100, 200, 300, 400, 500 (e.g. configured to implement one or more data flows 900, 1000 or operational flows 1100 described above) comprising:
transistor-based circuitry (e.g. a builder 1020 or other implementation module 169) configured to establish a first version 316A of a first operating system 216A in a first computing environment 411 (locally or otherwise) monitored by a first support interface 25A and a first version 316B of a second operating system 216B in a second computing environment 412 monitored by the first support interface 25A so that the first version 316A of the first operating system 216A supports a first resource 214A (e.g. one or more application functions 617 or other services 620) in the first computing environment 411;
transistor-based circuitry (e.g. a control module 167) configured to allow the first support interface 25A to advance a first application function 617 to and then pause (at least) the first application function 617 in a particular operational state 1085B in the first computing environment 411 running the first operating system 216A monitored by the first support interface 25A so that (at least) a first operating parameter 488 (from or otherwise) relating to the first computing environment 411 characterizes the particular operational state 1085B; and
transistor-based circuitry (e.g. another instance of an implementation module 169) configured to establish a polymorphed or other aliased second support interface 25B.

36. The computing environment aliasing support system of any of the above system Clauses comprising:
a first containment platform 128 that includes the first support interface 25A; and
a second containment platform 228 that includes the second support interface 25B.

37. The computing environment aliasing support system of any of the above system Clauses wherein the first resource 214A in the first computing environment 411 includes one or more application functions 617 comprising a library 564 of binary instruction sequences.

38. The computing environment aliasing support system of any of the above system Clauses comprising:
a containment platform 228 (e.g. implementing a container engine or other support interface 425) that shares a common kernel 129 that supports at least a first machine language instruction sequences 109 and one or more library-resident device-executable code sequences 109 operating on a single operating system 226 concurrently therewith.

39. The computing environment aliasing support system of any of the above system Clauses wherein at least one environment thereof contains a polymorphed interpreter 612.

40. The computing environment aliasing support system of any of the above system Clauses wherein at least one environment thereof contains a polymorphed or other aliased service 620 and another (instance of a) service 620 that is not aliased.

41. The computing environment aliasing support system of any of the above system Clauses wherein none of the device-executable instruction sequences 109 in a build environment 111, 511 contain any (subroutine calls or other) execution sequence jump instructions 487 that point to a device-executable instruction outside the build environment 111, 511 and wherein the build environment 111, 511 is configured to generate the polymorphed or other aliased second support interface 25B using a polymorphic compiler 516, 616.

42. The computing environment aliasing support system of any of the above system Clauses wherein none of the device-executable instruction sequences 109 in the build environment 111, 511 contain any subroutine calls or other execution sequence jump instructions 487 that point to a (device-executable instruction or other) public digital resource 214 (e.g. in a repository 91 outside the build environment 111, 511) and wherein the build environment 111, 511 is configured to generate the polymorphed or other aliased second support interface 25B using a polymorphic compiler 516, 616.

43. The computing environment aliasing support system of any of the above system Clauses wherein (an instance of) a control module 167 comprises a polymorphic binary instruction sequence 109 that does not contain any (subroutine calls or other) execution sequence jump instruction 487 that points to device-executable instruction code outside the build environment 111, 511 and wherein the build environment 111, 511 is configured to generate the polymorphed or other aliased second support interface 25B using a polymorphic compiler 516, 616.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other such transitive, relational, or other connections do not generally exclude such variants, unless context dictates otherwise.

What is claimed is:

1. A virtual environment aliasing support method comprising:
    invoking transistor-based circuitry configured to cause a first hypervisor to monitor first and second virtual environments simultaneously and selectively;
    invoking transistor-based circuitry configured to establish a first version of a first operating system in said first virtual environment monitored by said first hypervisor and a first version of a polymorphed second operating system in said second virtual environment simultaneously monitored by said first hypervisor so that said first version of said first operating system supports a first service in said first virtual environment wherein said first service includes a first version of a first application function running in said first virtual environment;
    invoking transistor-based circuitry configured to allow said first hypervisor to advance said first service to and then pause said first service in a particular operational state in said first virtual environment running said first operating system monitored by said first hypervisor so that a first operating parameter relating to said first virtual environment characterizes said particular operational state;
    automatically invoking transistor-based circuitry configured to establish a polymorphed second hypervisor as a conditional response to a first risk indicator; and
    invoking transistor-based circuitry configured to cause a migration of at least said first service to a third virtual environment monitored by said polymorphed second hypervisor.

2. The virtual environment aliasing support method of claim 1 wherein said migration of at least said first service to said third virtual environment monitored by said polymorphed second hypervisor is also a conditional response to said first risk indicator signaling a risk.

3. The virtual environment aliasing support method of claim 1 wherein invoking said transistor-based circuitry configured to establish said polymorphed second hypervisor comprises: invoking transistor-based circuitry configured to detect an event count reaching a threshold associated with a migration to said polymorphed second hypervisor; and causing one or more virtual environments to be monitored by said polymorphed second hypervisor instead of by said first hypervisor.

4. The virtual environment aliasing support method of claim 1 wherein invoking transistor-based circuitry configured to cause said migration of at least said first service to said third virtual environment monitored by said polymorphed second hypervisor comprises: aggregating first operating system source code in one or more repositories; generating said first and second operating systems in a first build environment using said first operating system source code; generating a third operating system in a second build environment also using said first operating system source code; and causing said polymorphed second hypervisor to monitor said third operating system in lieu of said first hypervisor monitoring said third operating system.

5. The virtual environment aliasing support method of claim 1 comprising:
    causing a second version of said second operating system to be created via an application of a polymorphic compiler to open-source operating system source code;
    causing the third virtual environment monitored by said second hypervisor to use said second version of said second operating system in a third virtual environment monitored by said second hypervisor; and
    migrating one or more services previously performed in said second virtual environment so that said one or more services will be performed in said third virtual environment instead wherein said one or more services include said first service.

6. The virtual environment aliasing support method of claim 1 comprising:
    causing some or all services previously performed in one or more firewalled virtual environments managed by said first hypervisor to be performed in one or more virtual environments monitored by said polymorphed second hypervisor instead as a conditional response to an indicator of a risk from said one or more firewalled virtual environments as a symptom that relates to said first hypervisor.

7. The virtual environment aliasing support method of claim 1 comprising:
    invoking transistor-based circuitry configured to allow said first hypervisor to pause at least said first service in a prior operational state in said first virtual environment running said first operating system monitored by said first hypervisor.

8. The virtual environment aliasing support method of claim 1 comprising: invoking transistor-based circuitry configured to respond to said first risk indicator of a first vulnerability by establishing a polymorphed second version of said first operating system in a first virtual environment monitored by said polymorphed second hypervisor so that said polymorphed second version of said first operating system supports a polymorphed second version of said first service running in said first virtual environment monitored by said polymorphed second hypervisor starting from said particular operational state characterized by said first operating parameter.

9. The virtual environment aliasing support method of claim 1 wherein said first risk indicator comprises at least one of a warning or error message; wherein said first hypervisor is also a polymorphed hypervisor; wherein a first probabilistic seed was used for generating said first hypervisor; wherein a second probabilistic seed was used for generating said second hypervisor; and wherein a difference between said first and second hypervisors resulted from a corresponding difference between said first and second probabilistic seeds.

10. The virtual environment aliasing support method of claim 1 wherein a first aliasing protocol was used for generating said first hypervisor; wherein a second aliasing protocol was used for generating said second hypervisor; and wherein a difference between said first and second hypervisors resulted from a corresponding difference between said first and second aliasing protocols.

11. A virtual environment aliasing support method comprising: invoking transistor-based circuitry configured to cause a first hypervisor to monitor first and second virtual environments simultaneously and selectively; invoking transistor-based circuitry configured to establish a first version of a first operating system in said first virtual environment monitored by said first hypervisor and a first version of a second operating system in said second virtual environment monitored by said first hypervisor so that said first version of said first operating system supports a first service in said first virtual environment wherein said first service includes a first version of a first application function running in said first virtual environment; invoking transistor-based circuitry configured to allow said first hypervisor to advance said first service to and then pause said first service in a particular operational state in said first virtual environment running said first operating system monitored by said first hypervisor so that one or more operating parameters relating to said first virtual environment characterizes said particular operational state; automatically invoking transistor-based circuitry configured to establish a polymorphed second hypervisor as a conditional response to a first risk indicator; and invoking transistor-based circuitry configured to cause a migration of at least said first service to a third virtual environment monitored by said polymorphed second hypervisor.

12. The virtual environment aliasing support method of claim 11 comprising:
automatically establishing said polymorphed second hypervisor as an immediate conditional response to a detected indicator of a first vulnerability.

13. The virtual environment aliasing support method of claim 11 comprising:
invoking transistor-based circuitry configured to use a second version of said second operating system in said third virtual environment monitored by second hypervisor; and
migrating one or more functions previously performed in said second virtual environment so that at least one of said one or more functions will thereafter be performed in said third virtual environment instead.

14. The virtual environment aliasing support method of claim 11 comprising:
causing one or more functions previously performed in one or more virtual environments monitored by said first hypervisor to be performed in one or more virtual environments monitored by said polymorphed second hypervisor instead as an automatic and conditional response to an indicator of a first security risk that relates to said first hypervisor.

15. The virtual environment aliasing support method of claim 11 comprising:
invoking a recognition module configured to detect an event count reaching a threshold associated with migration to a next hypervisor.

16. A virtual environment aliasing support system comprising: transistor-based circuitry configured to cause a first hypervisor to monitor first and second virtual environments simultaneously and selectively; transistor-based circuitry configured to establish a first version of a first operating system in said first virtual environment monitored by said first hypervisor and a first version of a second operating system in said second virtual environment monitored by said first hypervisor so that said first version of said first operating system supports a first service in said first virtual environment wherein said first service includes a first version of a first application function running in said first virtual environment; transistor-based circuitry configured to allow said first hypervisor to advance said first service to and then pause said first service in a particular operational state in said first virtual environment running said first operating system monitored by said first hypervisor so that one or more operating parameters relating to said first virtual environment characterizes said particular operational state; transistor-based circuitry configured to establish a polymorphed second hypervisor as an automatic and conditional response to a first risk indicator; and transistor-based circuitry configured to cause a migration of at least said first service to a third virtual environment monitored by said polymorphed second hypervisor.

17. The virtual environment aliasing support system of claim 16 wherein the first hypervisor and polymorphed second hypervisors comprise respective instances of binary executable code both derived from the same source code.

* * * * *